Sept. 9, 1947.  H. J. SPENCER  2,427,028
STAPLING DEVICE
Filed Dec. 15, 1944   5 Sheets-Sheet 3

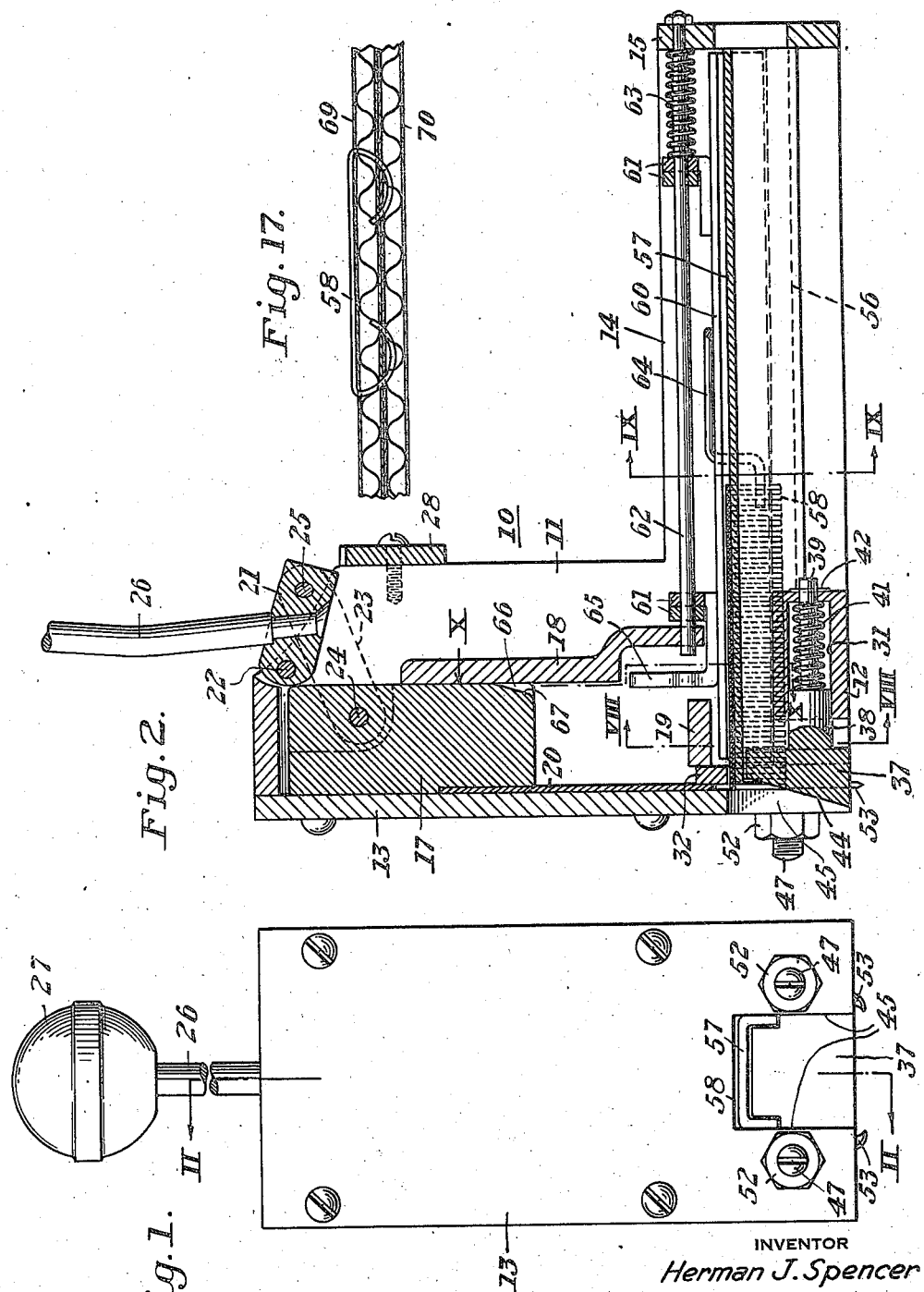

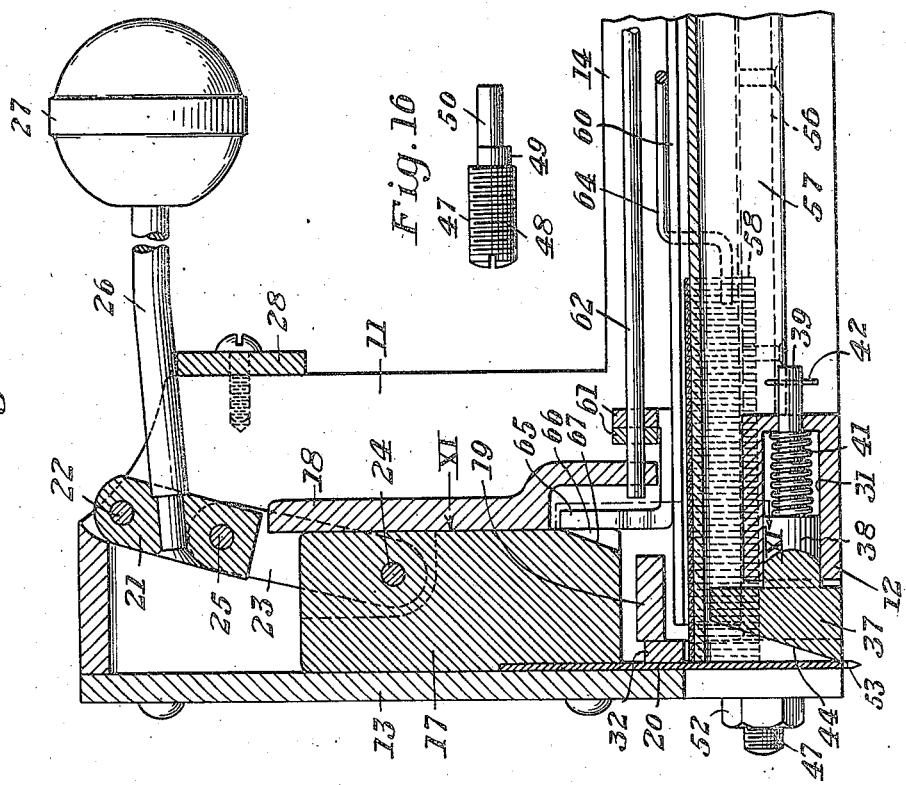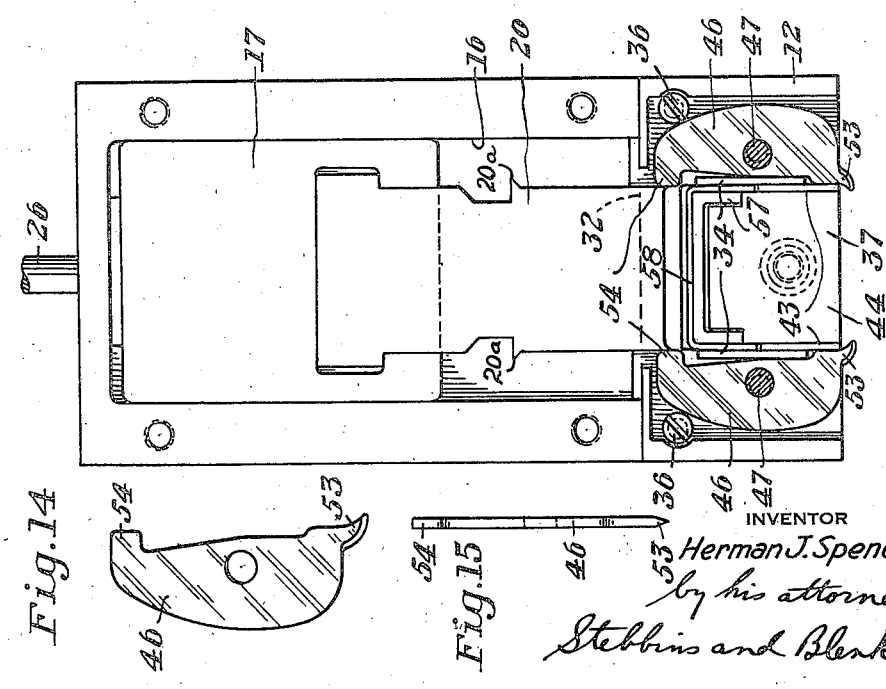

INVENTOR
Herman J. Spencer
by his attorneys
Stebbins and Blenko

Sept. 9, 1947.  H. J. SPENCER  2,427,028
STAPLING DEVICE
Filed Dec. 15, 1944  5 Sheets-Sheet 4
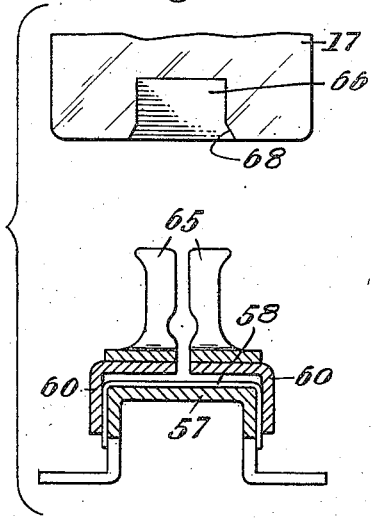
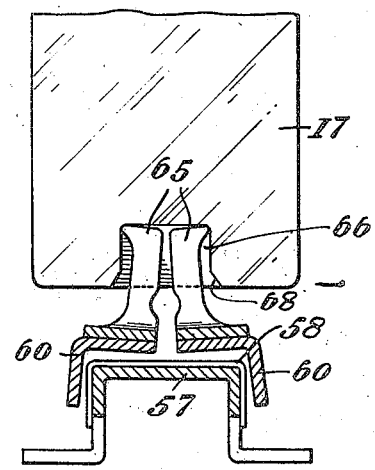
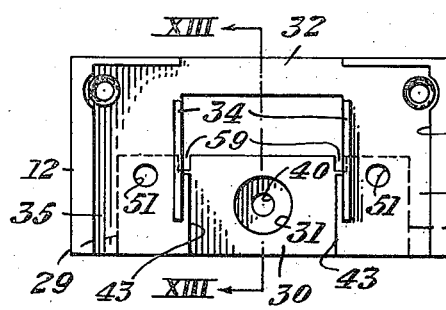
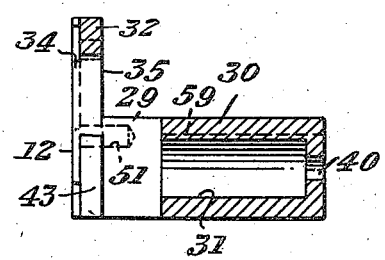
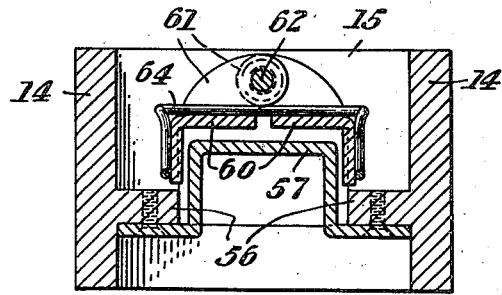
INVENTOR
Herman J. Spencer
by his attorneys
Stebbins and Blenko

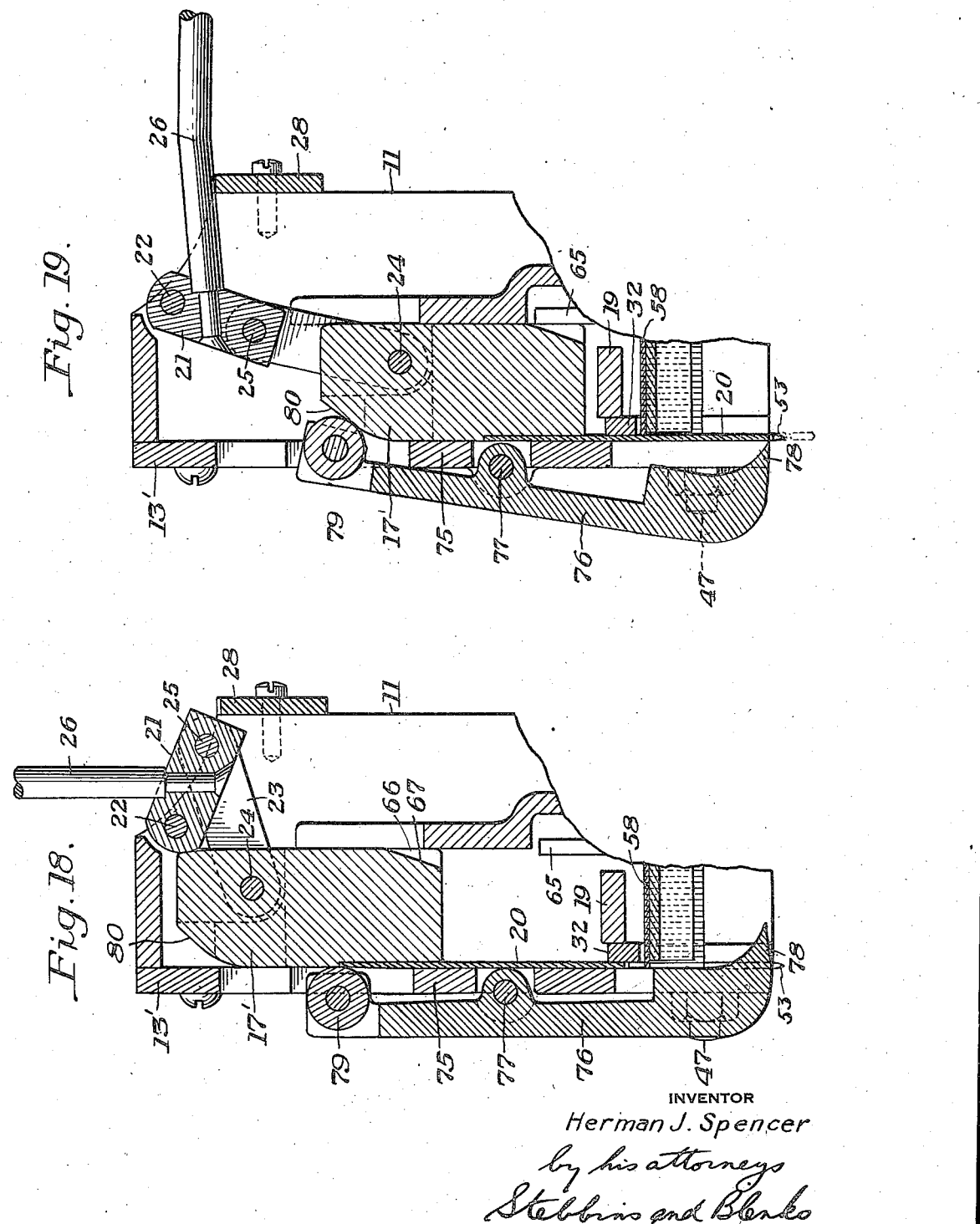

Patented Sept. 9, 1947

2,427,028

UNITED STATES PATENT OFFICE 2,427,028

STAPLING DEVICE

Herman J. Spencer, Pittsburgh, Pa.

Application December 15, 1944, Serial No. 568,303

8 Claims. (Cl. 1—49)

This invention relates to a device for stapling multiple thicknesses of material together.

This application is a continuation in part of my application, Serial No. 462,022, filed October 14, 1942, for Stapling device.

It is desirable, in numerous instances, to secure multiple thicknesses of material together where only the upper thickness is accessible. A familiar example is the securing together of the lapped side and end flaps of the conventional corrugated-board box. The devices available heretofore for performing such operations have not been entirely satisfactory and it is the object of my invention to improve generally thereon and to provide a device capable of securing multiple thicknesses of material with conventional, i. e., straight-headed and straight-sided, staples, when only the upper thickness of material is accessible.

In a preferred embodiment of the invention, I provide staple-driving means and means cooperating therewith effective to curve the entering ends of the staple legs progressively after they have penetrated the surface of the upper layer, whereby the staples are finally clinched after penetrating the second or other subsequent layer. I also provide means for preventing bending of the legs of the staple above the surface of the upper layer. By the aid of the invention, I avoid the necessity for special or deformed staples which are costly to manufacture and difficult to feed and drive.

The aforementioned preferred embodiment and practice of the invention will now be described in detail with reference to the accompanying drawings, in which:

Fig. 1 is an end elevation of my stapling device;

Fig. 2 is a longitudinal section therethrough taken along the plane of line II—II of Fig. 1 showing the parts in initial or starting position;

Fig. 3 is an end elevation with the cover plate removed, showing the parts in normal or starting position;

Fig. 6 is a sectional view similar to Fig. 2 showing the parts in actuated position;

Fig. 9 is a similar view taken along the plane of line IX—IX of Fig. 2;

Fig. 10 is a diagrammatic view partly in section along the plane of line X—X of Fig. 2;

Fig. 11 is a similar view along the plane of line XI—XI of Fig. 6;

Fig. 12 is a front elevation of a block inserted in the housing or body of the device;

Fig. 13 is a section taken therethrough along the plane of line XIII—XIII of Fig. 12;

Fig. 14 is an elevation of one of the die plates which effect the progressive bending of the entering ends of the staple legs;

Fig. 15 is an edge view thereof;

Fig. 16 illustrates one of the adjusting gudgeons on which the die plates are pivoted;

Fig. 17 is a sectional view through lapped thicknesses of corrugated board illustrating the condition of the staple after it has been fully driven;

Fig. 18 is a partial section similar to Fig. 2, showing a modification with the parts in position to be operated; and Fig. 19 is a view similar to Fig. 18 showing the parts in operated position.

Figure 7:
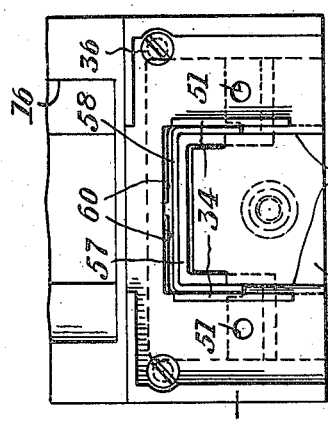
Fig. 7 is a partial front elevation with parts removed to exhibit the underlying structure.

Referring now in detail to the drawings, the staple-driving mechanism of my invention indicated generally at 10 comprises principally a housing or body 11, an insert block 12 and a cover plate 13. Spaced side walls 14 extend laterally from the body portion and are connected by a web 15.

The housing 11 is recessed as at 16 to provide a guide-way for a vertically reciprocable plunger 17. The guide-way is defined by the cover plate 13 and a transverse web 18, in addition to the spaced sides of the housing which are connected by said web. An additional web 19 also extends between the side walls of the housing adjacent the bottom of the recess 16.

Figure 4:
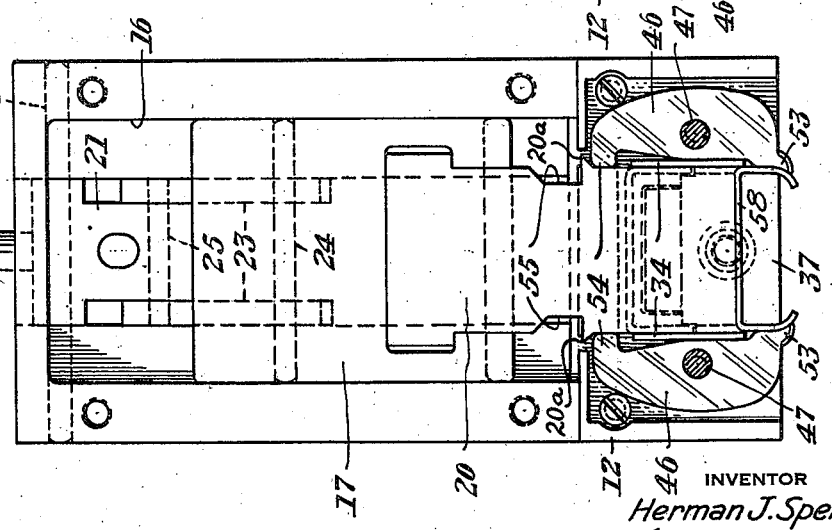
Fig. 4 is a view similar to Fig. 3 showing the parts in intermediate position.

The plunger 17 includes a staple driving, plate-like projection 20 extending downwardly therefrom. The projection 20 has a T-head fitting in a recess in the plunger as shown in Fig. 4. The plunger is reciprocated by means of a toggle linkage including a link 21 pivoted to the housing by a pin 22 and links 23 pivoted to the plunger by a pin 24. The links 21 and 23 are pivoted together at 25 and a lever 26 extending upwardly from the link 21 and having a handle or knob 27, provides means whereby the linkage may be extended to cause the plunger to descend, as shown in Fig. 6. A cross bar 28 extending between the side walls of the housing 11 serves as a stop to limit downward movement of the lever 26.

The inserted block 12, as shown in detail in Figs. 12 and 13, is generally U-shaped in plan, including spaced side members 29 and a central member 30 having a bore 31 therein open at the end toward the cover plate 13. The block also has an upwardly extending yoke 32. The front face of the block is recessed as at 33 and vertical guide ribs 34 are formed along the sides of the opening defined by the yoke 32. As indicated at 35 in Fig. 12, the sides of the front face of the block project laterally beyond the side members 29 as well as upwardly thereabove.

The block 12 is inserted in the lower portion of the housing 11 which is appropriately recessed to receive it, with the yoke 32 bearing against the web 19 and the laterally projecting sides 35 of the face of the block bearing against the sides of the housing, as shown in Fig. 7. The block is held in place by screws 36 having countersunk heads.

A yielding abutment 37 has a cylindrical, rearwardly extending portion 38 received in the bore 31 of the block 12. The cylindrical portion 38 is turned down to form a guide rod 39 extending through a hole 40 at the end of the bore and a compression spring 41 on the guide rod normally urges the abutment 37 forwardly to the limit of its permissible movement as determined by a cotter pin 42. The sides of the abutment 37 are guided by the vertical faces 43 of the block 12. The abutment has a sloping front face 44 which normally extends into a recess 45 in the lower edge of the cover plate 13. The sides of the recess 45 are in line with the faces 43 and cooperate therewith to guide the abutment 37.

Die plates 46 are disposed in the recess 33 in the face of the block 12, and are pivoted on gudgeons 47. As shown in Fig. 16, the gudgeons 47 have a threaded portion 48, an eccentric portion 49 and a concentric turned-down projection 50. The projections 50 extend into holes 51 formed in the recessed face of the block 12. The portions 48 are threaded into tapped holes in the cover plate 13 and are provided with lock nuts 52. The die plates 46 turn on the eccentric portions 49 of the gudgeons and may, therefore, be adjusted toward or from each other by loosening the nuts 52 and turning the gudgeons by means of the screw-driver slots in the ends thereof.

Figure 5:
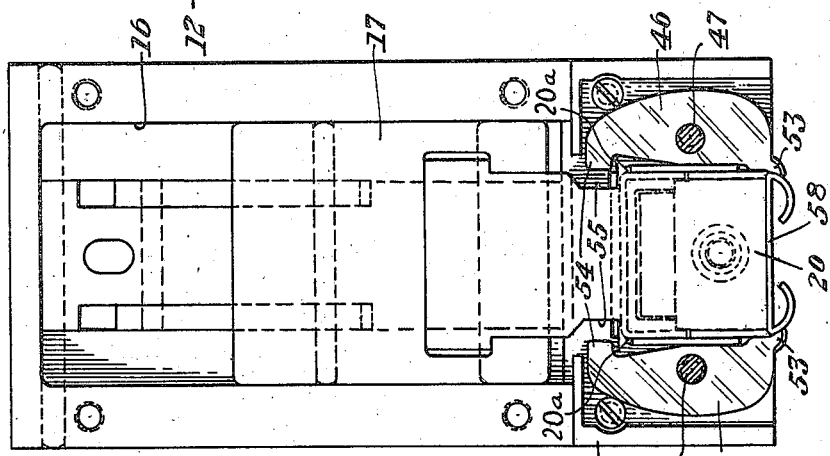
Fig. 5 is a view similar to Fig. 3 showing the parts in fully actuated position.

The die plates 46 have inwardly curved, lower ends 53 effective to bend the legs of a staple progressively as it is driven downwardly therebetween as will be described more fully later. The projections 53 are sharpened as clearly shown in Fig. 15 to facilitate partial penetration thereby of a thickness of material to be stapled. The upper ends of the die plates 46 are shaped as at 54 to bear on the edges of the driving plate 20. This limits outward movement of the projections 53 until the driving plate has reached its lowermost position as shown in Fig. 5 and notches 55 in the edges thereof have become alined with the upper ends 54 of the die plates.

Figure 8:
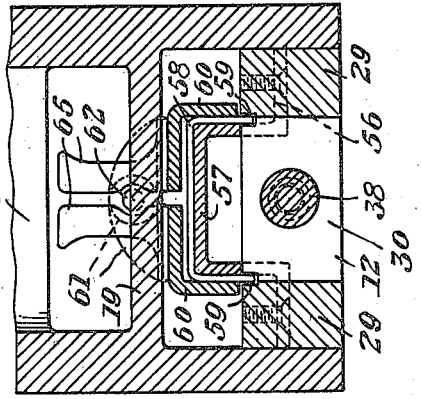
Fig. 8 is a partial transverse sectional view taken along the plane of line VIII—VIII of Fig. 2.

The laterally extending side walls 14 of the housing 11 have inwardly projecting ribs 56 thereon. A channel member 57 having its flanges secured to the lower faces of the ribs 56 serves as a guide for staples 58 disposed thereon. As shown in Figs. 6, 7 and 8, the staples 58 are of the conventional type, i. e., they have straight heads and straight legs. They are preferably provided in strip form, properly alined and held together by an adhesive. The flanges of the channel member 57 are notched to clear the block 12 and the latter is grooved at 59 to provide clearance for the ends of the staples. As shown in Figs. 2 and 6, the web of the guide channel member 57 terminates at a point so as to just clear the driving plate 20 when the latter has been forced down. These figures also show that the thickness of the driving plate 20 is substantially the same as that of the heads of the staples 58.

The staples are held on the channel member 57 and moved therealong by a pair of gripping angles 60 (Fig. 2) overlying substantially the whole length of the channel member 57. The angles 60 (Figs. 6, 9 and 17) have two sets of ears 61 whereby they are pivoted on a rod 62 mounted in the webs 15 and 18. A compression spring 63 between the web 15 and the rear ears 61 adjacent thereto normally tends to urge the angles toward the cover plate 13. A yoke-shaped spring 64 (Figs. 2 and 9) normally maintains the angles 60 in engagement with the staples 58 on the channel 57. It will be understood that the staples 58 are disposed on the channel by insertion through the opening in the web 15.

Actuating fingers 65 extend upwardly from the angles 60 adjacent the plunger 17 and may conveniently be formed integral with the adjacent forward ears 61 as shown in Figs. 2 and 6. The rear face of the plunger is recessed at 66 to provide an inclined surface 67. The sides of the recess 66 diverge downwardly as at 68. As a result, on descent of the plunger, the fingers 65 are first actuated from the position shown in Fig. 10 to that shown in Fig. 11 and are then moved rearwardly by the inclined surface 67 (Fig. 6), thereby compressing the spring 63. As shown in Fig. 11, it will be apparent that upon further downward movement of the plunger 17 to the position shown in Fig. 6 the fingers 65 will have moved out of engagement with the diverging sides 68 thus allowing spring 64 to actuate angles 60 and return them to the position shown in Fig. 10 to grip the staples. When the plunger is raised to the position shown in Fig. 10, the spring 63 moves the angles forward. The spring 63, however, cannot move the angles forward until the plunger 17 has moved above the fingers 65 and the driving blade 20 has cleared the top of the staples as shown in Fig. 3, because the plate 20, being in front of the staples, prevents forward movement thereof. The angles 60 have a firm grip on the staples and will move forward when they are free to move, i. e., when the plate 20 has been withdrawn. A step-by-step feeding of the staples is thus effected on each reciprocation of the plunger 17.

The structure of the device having now been fully described, the operation thereof will be explained in detail, assuming that the parts are initially in the position indicated in Fig. 2 and that a supply of staples is in position on the guide channel 57. The device is placed on the multiple thicknesses to be secured together, e. g., the lapped end and side flaps 69 and 70 as shown in Fig. 17 whereupon the projections 53, because of their sharp edges, penetrate the upper thickness. The lever 26 is then pulled down causing the plunger 17 and driving plate 20 to descend. The lower end of the driving plate 20 engages the head of the leading staple and detaches it from the remainder. It is to be noted that, as shown in Figs. 2 and 7, the entering ends of the legs of the leading staple straddle the abutment 37 when in starting position. As the head of the descending staple engages the sloping face 44 of the abutment, the latter is forced rearwardly but the staple legs are confined, as they descend, between the sides of the abutment and the guide ribs 34, as appears clearly in Fig. 3. The edges of the faces 43 serve as guides for the backs of the staple legs.

As the lower ends of the staple legs engage the projections 53 on the die plates 46, they are curved inwardly, as shown in Fig. 4. As this inward curving of the staple legs commences, the upper portions of the legs are held against inward bending by the lower portion of the abutment 37 which still projects between the staple legs. The engagement of the staple legs with the projections 53 tends to force the upper ends of the plate 46 inwardly but, as previously pointed out, such movement is prevented by engagement with the edges of the driving plate 20.

On further descent of the plunger and driving plate, the curving of the staple legs continues progressively, to effect tight clinching by the time the plunger reaches its lowermost position as shown in Fig. 5. Final clinching is effected by lateral projections 20a on the slide 20 which force the upper ends of the plates 46 outwardly and their lower ends inwardly, as the slide approaches the bottom of its stroke. The depth to which the staple legs penetrate depends on the curvature imparted thereto and this in turn is governed by the initial setting of the projections 53. This setting may be adjusted, as already explained, by turning the gudgeons 47. Fig. 17 illustrates the manner in which the staple legs penetrate the underlying thickness of material in order to secure the two thicknesses tightly together.

When the plunger and driving plate have reached their lowermost positions, the notches 55 in the edges of the plate are in alinement with the upper ends 54 of the die plates whereby inward movement thereof is permitted. The projections 53 are thus free to open up and clear the clinched staple so the device can be removed to another point at which a staple is to be driven.

The operation of the gripper angles 60 to feed the staples forward has already been described. It will be apparent from such description that on swinging the lever 26 upwardly to retract the plunger and the driving plate, the angles 60 having already closed down on the staples, will move forward to feed another staple into a position in alinement with the end of the driving plate.

The apparatus described above operates quite satisfactorily with staples formed from relatively light-gage stock. When heavier staples are employed, however, the spring-pressed plunger 37 may not exert sufficient force to overcome the tendency for the staples to bend sharply at their corners instead of progressively on a smooth curve throughout the length of the legs. For use with staples formed from heavier stock, I provide a modified device including a supporting member or forming bar having a portion which projects into the path of the staple being driven, adapted to be progressively displaced thereby, and controlled by the descent of the plunger. The supporting member performs two functions. In the first place, the upper surface of the member supports the crown of the staple as it is being driven. In the second place, the sides of the forming member support the unbent portions of the staple legs and prevent bending thereof at the corners, thus insuring the progressive bending of the staple legs on a smooth curve throughout their length. This modification is illustrated in Figures 18 and 19.

As shown in the drawings, the modified form of stapling device is generally similar to that already described, corresponding parts being designated by the same reference numerals, or the same numerals with a prime affixed where slight differences exist. The cover plate 13' is recessed to receive a bearing block 75 and a forming bar or supporting lever 76 pivoted thereon at 77. The lever 76 has a toe 78 at the lower end thereof adapted to project into the opening in the yoke 32 and into the path of a staple being driven by plate 20 of plunger 17', in about the same manner as the sloping front face 44 of the abutment 37. The upper end of the lever 76 has a cam roller 79 engaging the adjacent face of the plunger 17' the upper end of which is machined out centrally on a curve as indicated at 80.

The upper surface of the toe 78 slopes downwardly and inwardly. As a result, a staple being driven tends to displace the toe and tilt the lever clockwise in somewhat the same manner as the abutment 37 is displaced. This condition is illustrated in Figure 19. The toe 78, however, is held in staple-supporting position by the engagement of the roller 79 with the face of the plunger 17' and tilting of the lever is permitted only when the plunger has descended sufficiently to permit the roller to enter the machined-out portion 80. It will be understood that the parts are so designed that tilting of the lever is permitted in time for it to clear the descending staple while continuing to support it progressively.

As already stated, the upper surface of the toe 78 supports the crown of the staple. At the same time, the side surfaces of the toe support the unbent portions of the staple legs, thereby preventing bending of the staples at the corners thereby insuring the progressive bending of the staple legs on a smooth curve.

It will be apparent that the forming bar or supporting lever 76 performs the same functions as the plunger 37 but differs therefrom in that the retraction of the toe 78 is positively controlled by the descent of the plunger, instead of simply by the compression spring used with the plunger 37.

I claim:

1. Stapling mechanism comprising a housing, a plunger reciprocable therein, a staple guide extending at an angle to the path of the plunger and terminating adjacent thereto, and die plates pivoted on said housing adjacent said path, said plates having knife-edged projections below the end of said path, extending inwardly thereof, adapted to penetrate the material to be stapled and effective to impart a curve to the ends of the legs of a staple delivered along said guide and driven downwardly by said plunger, said plates also having means adjacent their upper ends adapted to engage said plunger to hold said projections in staple-bending position.

2. Stapling mechanism comprising a housing, a plunger reciprocable therein, a staple guide extending at an angle to the path of the plunger and terminating adjacent thereto, die plates pivoted on said housing adjacent said path, said plates having knife-edged projections below the end of said path, adapted to penetrate the material to be stapled extending inwardly thereof, and effective to impart a curve to the ends of the legs of a staple delivered along said guide and driven downwardly by said plunger, and means adjacent the upper ends of said plates engaging the plunger for rigidly holding said plates with their projections in operative position until the plunger has substantially completed its stroke.

3. A stapling device comprising a housing, a staple-driving plunger reciprocable therein, means for feeding staples into position to be driven by said plunger, means in the path through which the staple is driven by said plunger for bending the staple legs progressively as they are driven, and a forming bar pivoted on said housing having a toe projecting into said path for progressively supporting the crown of the staple from below while it is being driven, said toe having a sloping upper surface whereby it is displaced as the staple is driven, and the sides of the bar serving to support the unbent portions of the staple legs.

4. A stapling device comprising a housing, a staple-driving plunger reciprocable therein, means for feeding staples into position to be driven by said plunger, means in the path through which the staple is driven by said plunger for bending the staple legs progressively as they are driven, means pivoted on said housing, projecting into said path progressively supporting the crown of the staple from below while being driven and serving as a forming member around which the staple legs are progressively bent, said means being displaceable by said plunger and means limiting the angular movement of said supporting means in accordance with the movement of the plunger.

5. A stapling device comprising a housing, a staple-driving plunger reciprocable therein, means for feeding staples into position to be driven by said plunger, means in the path through which the staple is driven by said plunger for bending the staple legs progressively as they are driven, a forming bar pivoted on said housing having a toe projecting into said path for progressively supporting the crown of the staple from below while it is being driven, said toe having a sloping upper surface whereby it is displaced as the staple is driven, and the sides of the bar serving to support the unbent portions of the staple legs, and a cam surface on said plunger engaged by a portion of said bar effective to control the displacement of the bar in accordance with the descent of the plunger.

6. A stapling device comprising a housing, a staple-driving plunger reciprocable therein, means for feeding staples into position to be driven by said plunger, means in the path through which the staple is driven by said plunger for bending the staple legs progressively as they are driven, a forming bar pivoted intermediate its ends on said housing, the lower end of said bar having a toe projecting into said path to support the staple crown and be displaced thereby, the sides of the bar supporting the unbent portions of the staple legs, a cam surface on the plunger and cam engaging means on the upper end of the bar effective to control the displacement of said toe in accordance with the descent of the plunger.

7. A stapling device comprising a housing, a staple-driving plunger reciprocable therein, means for feeding staples into position to be driven by said plunger, means in the path through which the staple is driven by said plunger for bending the staple legs progressively as they are driven, a forming bar pivoted on said housing for tilting movement and having a toe projecting into said path for progressively supporting the crown of the staple from below while it is being driven, and means limiting tilting movement of said bar in accordance with the descent of the plunger.

8. A stapling device as defined by claim 1 characterized by means on the plunger for causing an instantaneous inward movement of said projections to clinch the staple legs finally when they have been substantially fully deformed.

HERMAN J. SPENCER.

REFERENCES CITED

The following references are of record in the file of this patent:

UNITED STATES PATENTS

| Number | Name | Date |
|---|---|---|
| 1,815,066 | Maynard | July 21, 1931 |
| 1,829,537 | Polzer | Oct. 27, 1931 |
| 2,150,127 | Passek | Mar. 7, 1939 |

FOREIGN PATENTS

| Number | Country | Date |
|---|---|---|
| 38,700 | Germany | Mar. 11, 1887 |